United States Patent
Sunagawa

(10) Patent No.: US 6,823,128 B1
(45) Date of Patent: Nov. 23, 2004

(54) SIGNAL PROCESSING APPARATUS

(75) Inventor: Osami Sunagawa, Toyonaka (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/404,876

(22) Filed: Sep. 24, 1999

(30) Foreign Application Priority Data

Sep. 29, 1998 (JP) ............................. 10-275599
Jun. 1, 1999 (JP) ............................. 11-153475

(51) Int. Cl.⁷ ................................. H04N 5/91
(52) U.S. Cl. ........................... 386/46; 386/78
(58) Field of Search ................. 386/46, 107, 108, 386/120, 95, 47, 51, 57, 65, 88, 2, 116, 49, 76, 78, 79, 81, 80, 100, 113, 114, 21; H04N 5/91

(56) References Cited

U.S. PATENT DOCUMENTS

| | | | |
|---|---|---|---|
| 4,943,854 A | * 7/1990 | Shiota et al. | ............... 358/159 |
| 5,267,039 A | 11/1993 | Elberbaum | |
| 5,438,458 A | * 8/1995 | Honjo | ............................ 386/2 |
| 5,617,268 A | * 4/1997 | Sakakibara et al. | ....... 360/77.14 |
| 5,625,504 A | 4/1997 | Okada et al. | |
| 6,011,894 A | * 1/2000 | Nakamura et al. | ............ 386/46 |
| 6,522,831 B2 | * 2/2003 | Tanaka et al. | .............. 386/116 |

FOREIGN PATENT DOCUMENTS

| | | |
|---|---|---|
| DE | 197 05 264 A1 | 8/1997 |
| GB | 2 326 049 A | 12/1998 |
| JP | 61-20218 | 1/1986 |
| JP | 05-316470 | 11/1993 |
| JP | 359045787 A * | 3/1994 |
| JP | 09-154103 | 6/1997 |

* cited by examiner

Primary Examiner—Robert Chevalier
(74) Attorney, Agent, or Firm—Armstrong, Kratz, Quintos, Hanson & Brooks, LLP

(57) ABSTRACT

A signal processing apparatus including a write controller. This write controller specifies a start position of an effective time period of each field, based on an ID signal superimposed over lines 15 to 18 of an odd numbered field video signal and over lines 177 to 280 of an even numbered field video signal. The video signal at and following a specified start position is written to a memory. The video signal written on the memory is read out by a read controller. As a result, corresponding videos are displayed on the monitor.

12 Claims, 18 Drawing Sheets

FIG. 9
(A)
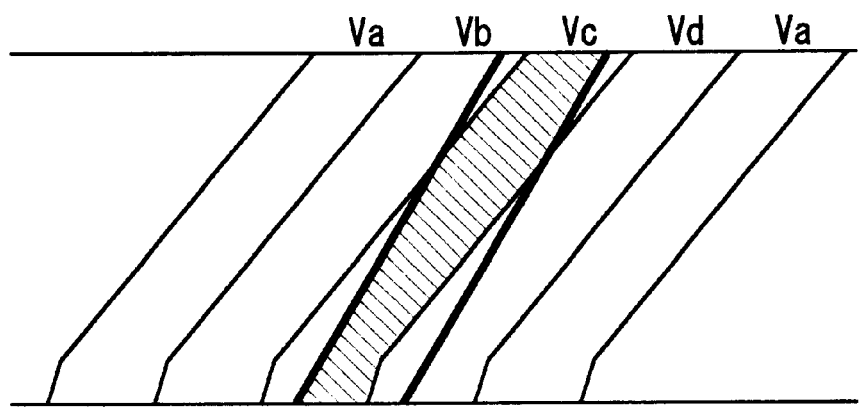
(B)
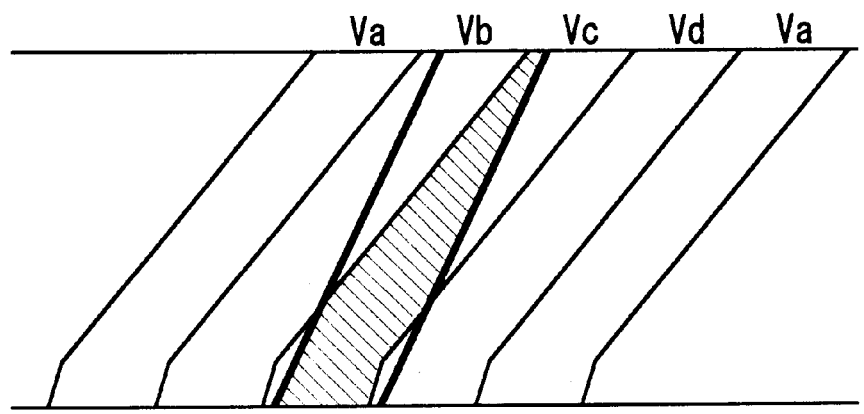

SIGNAL PROCESSING APPARATUS

BACKGROUND OF THE INVENTION

1. Field of the Invention

This invention relates to signal processing apparatuses and, more particularly, to a signal processing apparatus used to process a composite video signal outputted from, for example, a time lapse VCR wherein the composite video signal contains predetermined information and video components respectively provided in first and second predetermined positions of a field.

Meanwhile, the invention is concerned with a signal processing apparatus which processes a signal reproduced from a magnetic tape and having a video component and predetermined information component.

2. Description of the Related Art

According to a conventional monitor camera system shown in FIG. 16, a plurality of monitor cameras 1a–1d output respective video signals Va–Vd. The video signals Va–Vd are thinned out every field by a multiplexer 4. The thinned-out video signals are intermittently recorded onto a video cassette 3 by a time lapse VCR 2. On a video tape 3a, video tracks Va–Vd are formed, for example, as shown in FIG. 17. The video tracks Va–Vd are recorded with ID signals corresponding to the monitor cameras 1a–1d. To conduct reproduction from the video cassette 3 containing intermittent recordings, it is a practice to add pseudo vertical sync signals to the respective reproduced video signals Va–Vd by using the time lapse VCR 2 for the purpose of preventing the missing of a vertical sync signal or erroneous detection of vertical sync signal due to switching noise. Meanwhile, the reproduced video signals change in kind every field. Accordingly, the reproduced video signals Va–Vd are written onto memories 4a–4d in accordance with their ID signals by the multiplexer 4, which are thereafter outputted therefrom onto the monitor 5. As a result, reproduced videos Va–Vd are divisionally displayed on the monitor 5 as shown in FIG. 18.

However, when the video signals Va–Vd are written to the memories 4a–4d by the multiplexer 4, the timing of write start is determined based on the pseudo vertical sync signal. As a result of this, if the pseudo vertical sync signal is inaccurate in position of adding, deviation may occur at a start of writing. This results in vertical deflection in the reproduced videos Va–Vd being displayed on the monitor 5. That is, the video component starts at 30 H in each field. Nevertheless, if the pseudo vertical sync signal is deviated in adding position as shown in FIG. 19, a deviation occurs in the reproduced video displayed on the monitor 5.

On the other hand, if the I) signal be not successfully reproduced, the multiplexer 4 possibly writes a reproduced video signal into an incorrect memory or outputs onto the monitor 5 an input from the time lapse VCR 2 without processing. In either case, it is difficult for the reproduced videos Va–Vd to properly display on the monitor 5.

SUMMARY OF THE INVENTION

It is, therefore, a primary object of the present invention to provide a video signal processing circuit which is capable of preventing deflection in reproduced videos.

Another object of the invention is to provide a video signal processing circuit which can improve the accuracy of determining a predetermined information component contained in a reproduced signal.

According to the present invention, a signal processing apparatus for processing a video signal having predetermined information component provided in a first predetermined position in each field, comprises: a detector for detecting the predetermined information component; a processor for specifying a second predetermined position of the video signal based on the predetermined information component detected; a memory; a write controller for writing the video signal from the second predetermined position to the memory; and a read controller for reading out the video signal written in the memory.

Detected is a predetermined information component provided in a first predetermined position of each field by the detector. The processor specifies a second predetermined position of a video signal based on a detected predetermined information component. The write controller writes the video signal from the second predetermined position to the memory. The read controller reads the video signal thus written out of the memory. As a result of this, there is no vertical deflection in a video signal read from the memory.

In one aspect of the invention, in the processor a particular information detecting circuit detects particular information from the predetermined information component. A first counter counts the number of lines based on a detection time point, as a reference, of the particular information and outputs second predetermined position information.

In one embodiment, the predetermined information component lies over a plurality of lines. The specifying means includes a start position detecting circuit to detect a start position of the predetermined information component. A second counter counts the number of lines based on a detection time point, as a reference, of the start position and outputs the second predetermined position information.

Further, an end position detecting circuit detects an end position of the predetermined information component. A third counter counts the number of lines based on a detection time point, as a reference, of the end position and outputs the second predetermined position information.

If a plurality of second position information are obtained in this manner, a selector selects any second predetermined position information according to a predetermined order.

The write controller resets a write address according to the second predetermined position information outputted from the select means.

Incidentally, the second predetermined position is a start position of an effective component of the video signal.

According to the present invention, a signal processing apparatus for processing a video signal having a predetermined information component provided in a first predetermined position of each field, comprises: a detector for detecting the predetermined information component; and a signal generator for outputting a tracking control signal based on a reproduction characteristic.

The magnetic tape is recorded with a signal including a video component and a predetermined information component. The detector detects a reproduction characteristic of a portion including a predetermined information component, based on a reproduced signal from the magnetic tape. On the other hand, the signal generator outputs a tracking control signal based on a detected reproduction characteristic. Consequently, it is possible to accurately determine a predetermined information component.

In one aspect of the present invention, the magnetic tape is formed with a plurality of tracks, and the video component and the predetermined information component is reproduced from each track. Here, the plurality of tracks are formed in a helical scan scheme on the magnetic tape. In the detector, detected is a reproduction characteristic of a portion including a predetermined information component, as follows. First, a missing detecting circuit detects a missing portion of a reproduced signal. An enable circuit enables an output of the missing detecting circuit in a predetermined position of each track. The signal generator outputs a tracking control signal in response to an output of the missing detecting circuit being enabled.

In another aspect of the present invention, the detector detects a reproduction characteristic, as follows. That is, first a component detecting circuit detects the predetermined information component, and then a determination circuit determines a content of the predetermined information component. The signal generator outputs a tracking control signal in response to a result of determination of the determining means.

In another aspect of the present invention, an eliminator removes a predetermined frequency component from the reproduced signal, and a characteristic controller changes a frequency characteristic of the eliminator depending upon a reproduction position. Here, the eliminator includes a plurality of filters different in cut-off frequency, and the characteristic controller selects any one of the plurality of filters. That is, the characteristic controller lowers a cut-off frequency when reproducing the predetermined information component. The cut-off frequency at a time of reproduction of the predetermined information component is included in a frequency band of the video component.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 9 is an illustrative view showing tracks formed on a video tape and tracking state in the FIG. 8 embodiment;

DETAILED DESCRIPTION OF THE PREFERRED EMBODIMENTS

Figure 1:
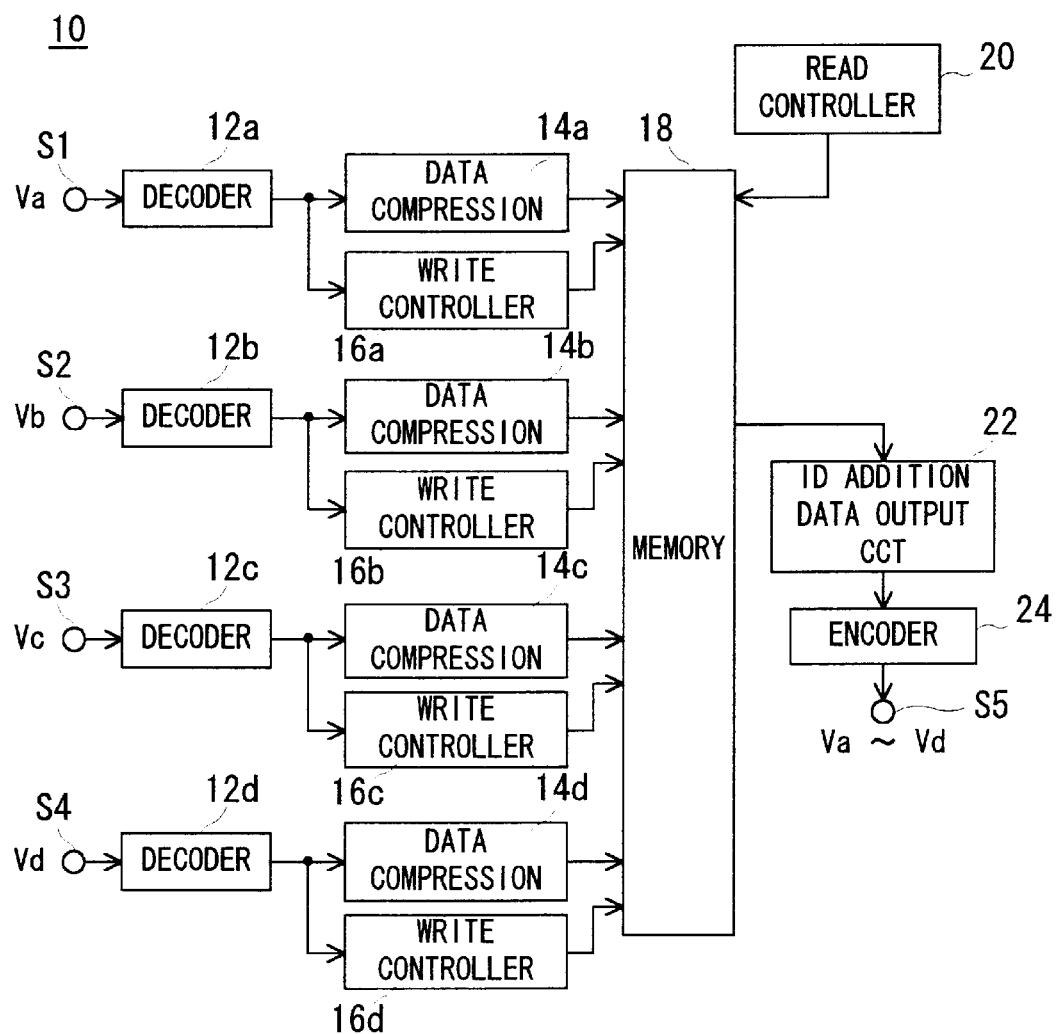
FIG. 1 is a block diagram showing one embodiment of the present invention.
Figure 16:
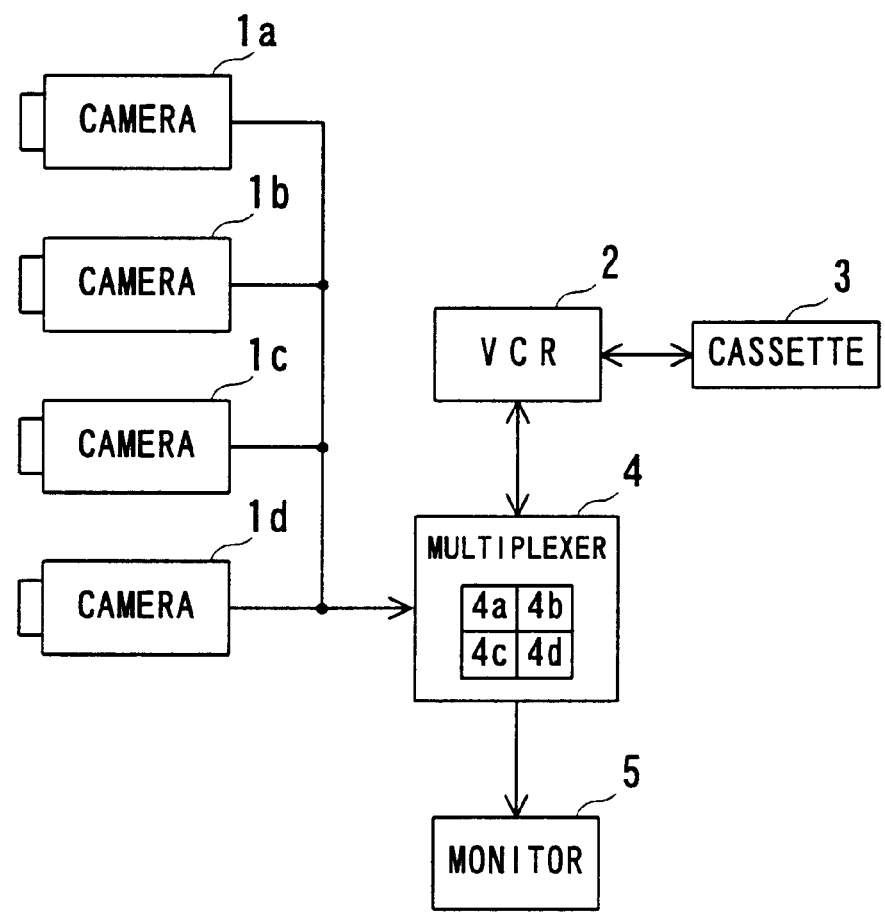
FIG. 16 is a block diagram showing a prior art.
Figure 17:
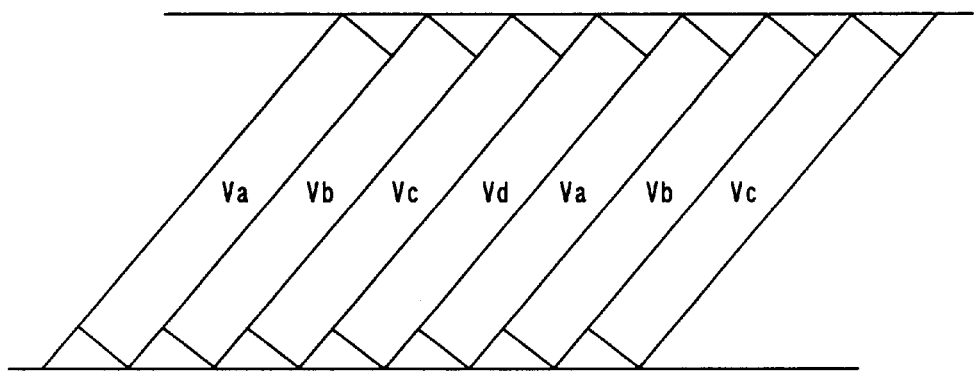
FIG. 17 is an illustrative view showing one part of operation in the FIG. 16 prior art.
Figure 18:
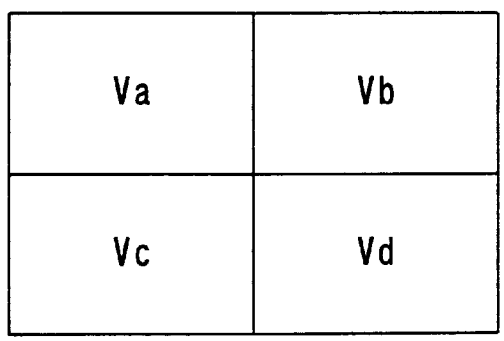
FIG. 18 is an illustrative view showing another part of operation in the prior art shown in FIG. 16.
Figure 19:
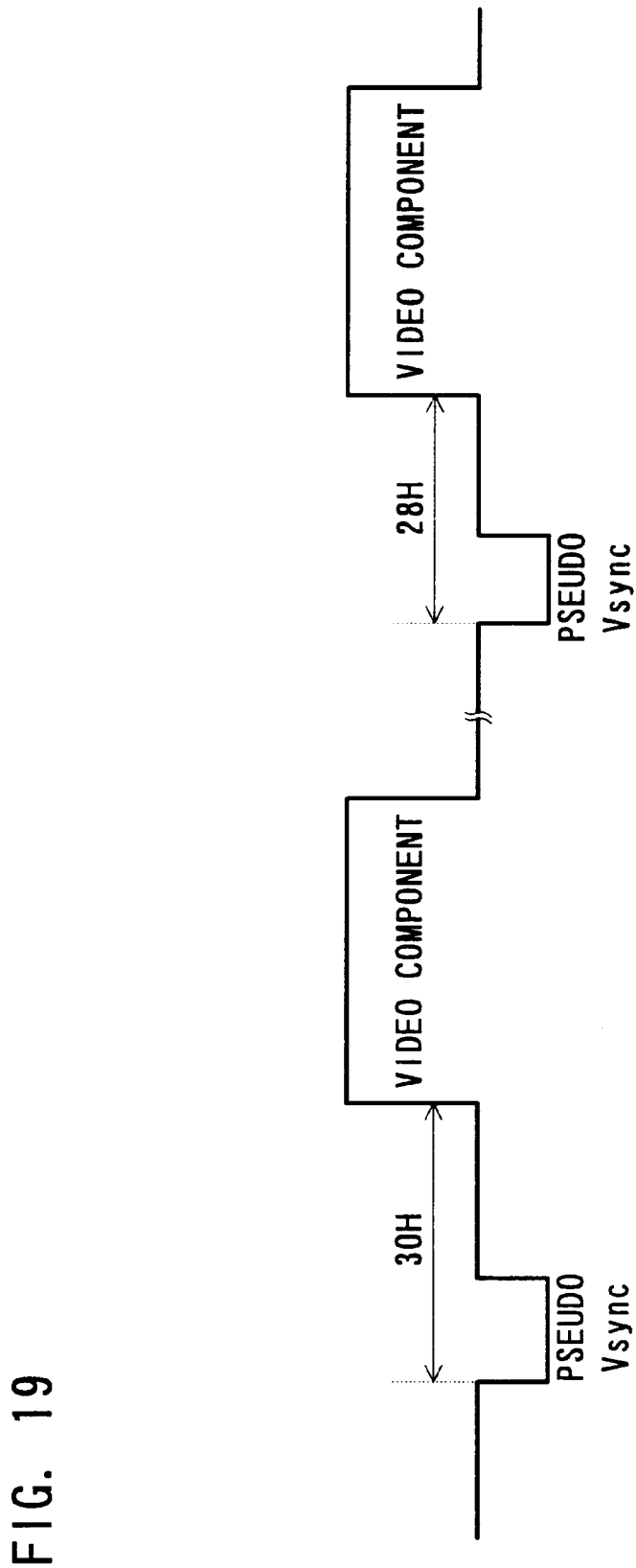
FIG. 19 is a waveform diagram showing another part of operation in the prior art shown in FIG. 16.

Referring to FIG. 1, a monitor camera system of this embodiment is similar to the monitor camera system of FIG. 16, except in that a multiplexer 10 is configured as shown in FIG. 1. Accordingly duplicated explanations will be herein omitted.

Figure 7:
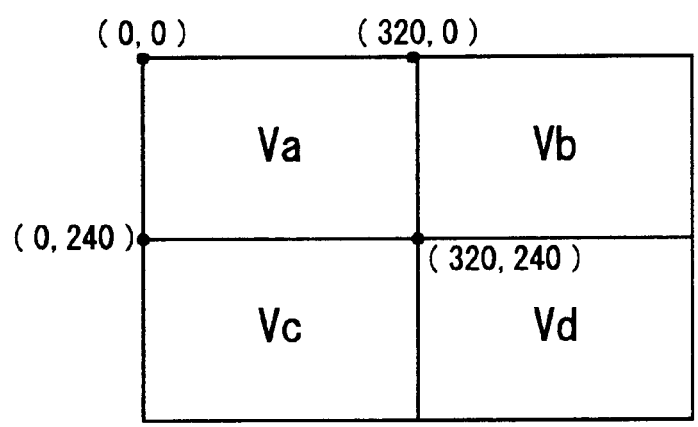
FIG. 7 is an illustrative view showing a memory.

Analog composite video signal Va–Vd, as output from a time lapse VCR 2, are respectively supplied to decoders 12a–12d through input terminals S1–S4. The decoders 12a–12d output respective digital composite video signals Va–Vd. The composite video signals Va–Vd are respectively compressed down to ¼ in size into compressed video signals Va–Vd by data compression circuits 14a–14d. The compressed video signals Va–Vd are then written into predetermined addresses of a memory 18, in accordance with write address signals outputted from corresponding write controllers 16a–16d. As a result, the memory 18 stores the compressed video signals Va–Vd in a manner as shown in FIG. 7.

The memory 18 is scanned through a raster scan scheme by a read controller 20. As a result of this, the compressed video signals Va–Vd are read out of the memory 18. The read compressed video signals Va–Vd are processed through an ID additional data output circuit 22 and encoder 24, and then outputted onto a monitor 5 via a terminal S5.

Figure 2:
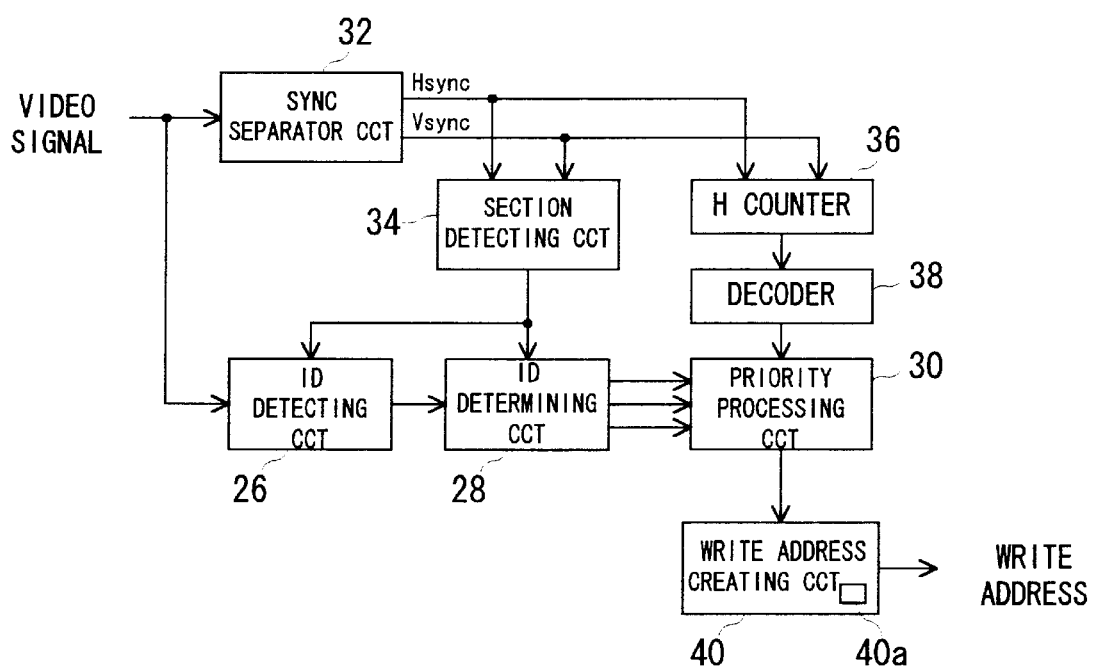
FIG. 2 is a block diagram showing a write controller.
Figure 6:
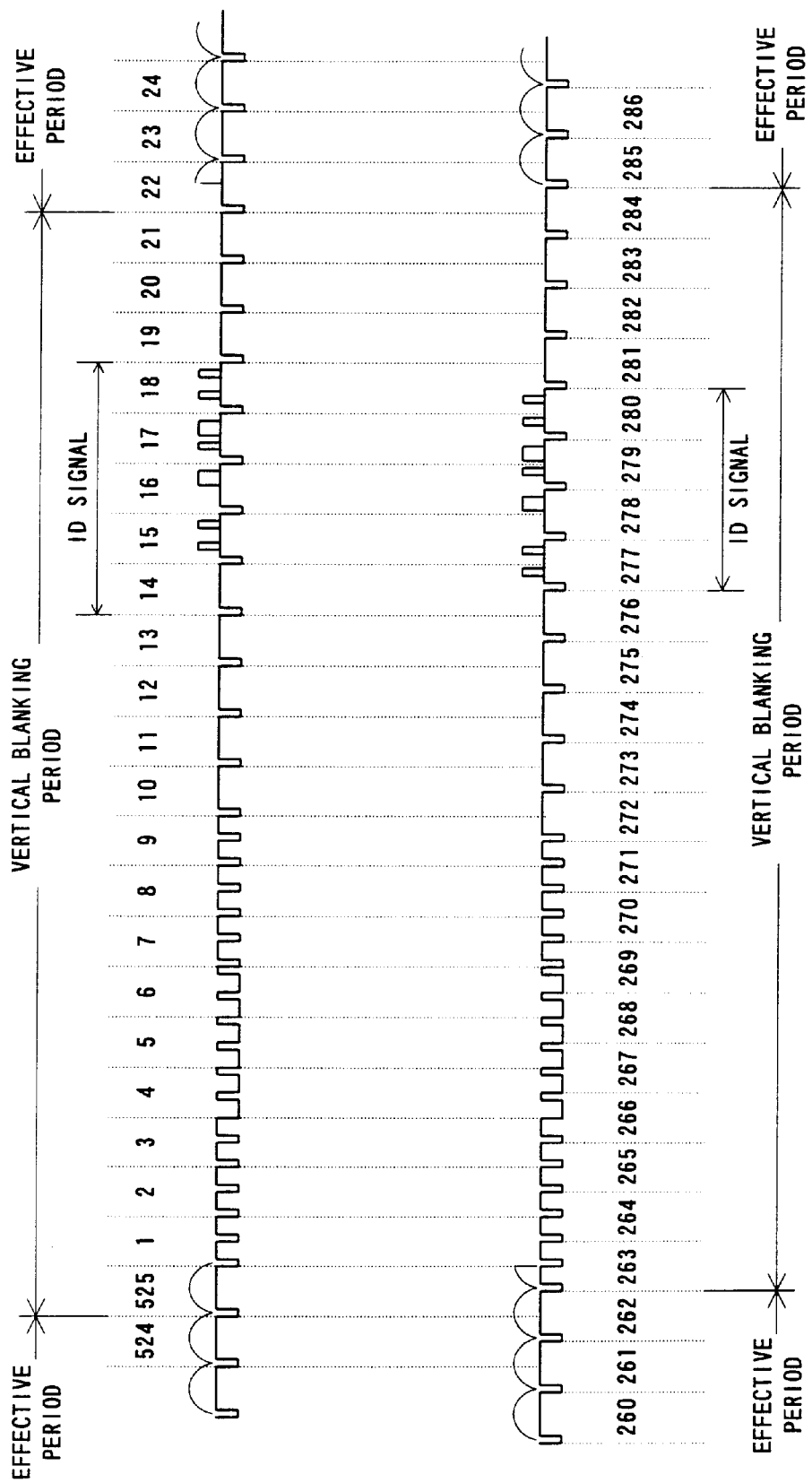
FIG. 6 is an illustrative view showing one part of a composite video signal.

The respective composite video signals Va–Vd have added ID signals corresponding to monitor cameras. As understood from FIG. 6, the ID signal is superimposed over lines 15 to 18 of an odd numbered field and over lines 277 to 280 of an even numbered field. This embodiment is contemplated to specify a position of starting an effective time period including a video component, based on an ID signal superimposed on predetermined lines. That is, if a pseudo vertical sync signal is not added accurately in position, the video component written on each memory 16a–16d results in vertical deflection. Thus, it is possible to specify a start position of a video component based on a position added by a pseudo vertical sync signal. In this embodiment, therefore, detected is an ID signal superimposed on a predetermined position to thereby determine a write address of the memory 18 according to the ID signal. It should be noted that FIG. 6 represents a composite signal according to an NTSC scheme. In a PAL scheme 1 frame comprises 625H and 1 field 312.5 H. Consequently, the ID signal is superimposed over lines 15–18 of an even numbered field and lines 327–330 of an odd numbered field Each of the write controllers 16a–16d is configured as shown in FIG. 2. The composite video signal outputted from a corresponding decoder is supplied to a synchronizing separator circuit 32 and an ID detection circuit 26. The synchronizing separator circuit 32 separates a horizontal sync signal and vertical sync signal from the input composite video signal and supplies the separated sync signals to a section detecting circuit 34. The section detection circuit 34 detects a 10-lines section to be considered including an ID signal based on the input sync signals, and enables, in a detected section, the ID detecting circuit 26 and the ID determining circuit 28. The ID detecting circuit 26 monitors the level of an input signal and output a high level signal when a high level period exceeds 3 $\mu$seconds. In this manner, an ID signal is detected that has been superimposed over a video signal.

Figure 3:
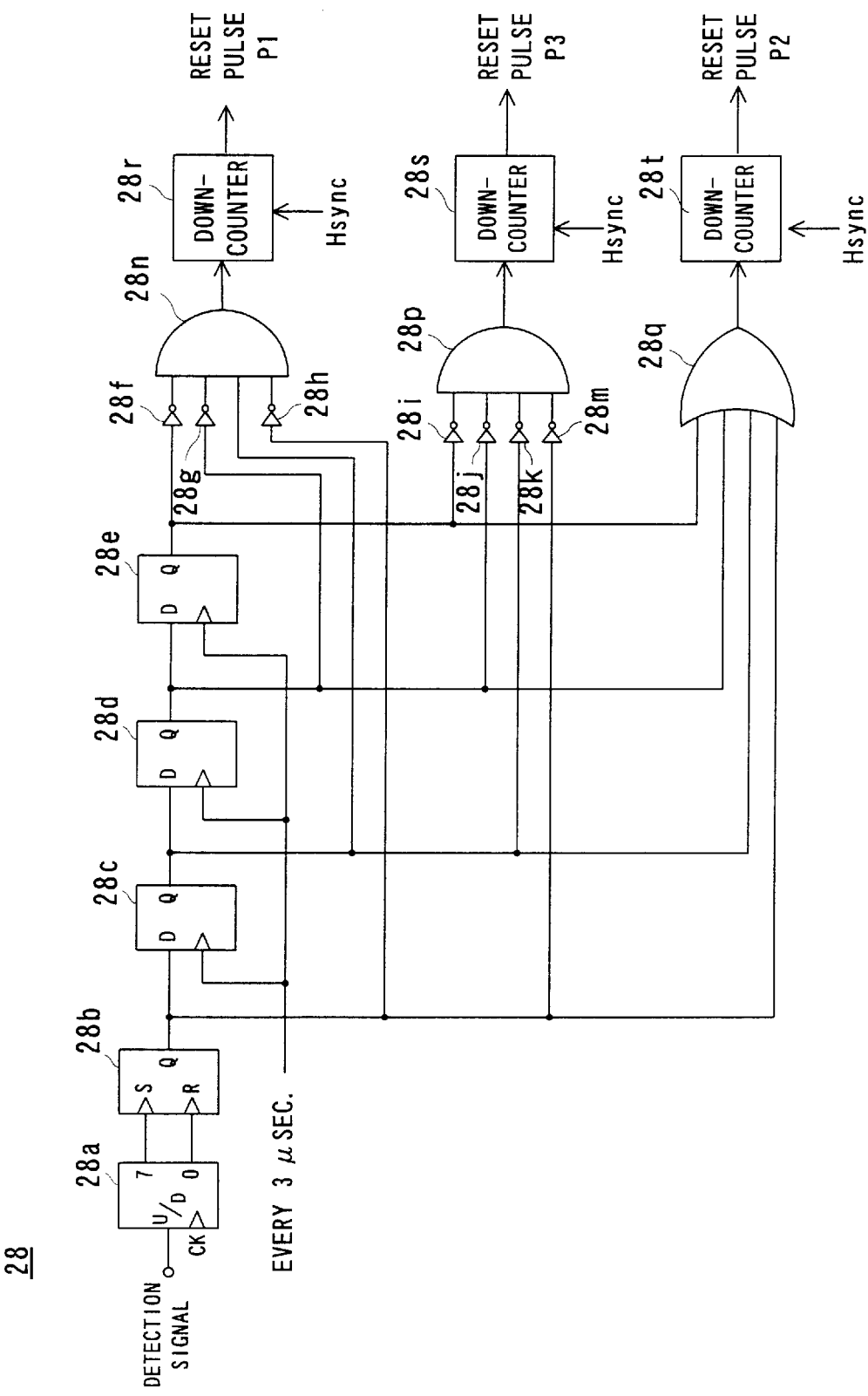
FIG. 3 is a block diagram showing an ID determining circuit.

The ID determining circuit 28 is configured as shown in FIG. 3. The ID detection circuit 26 has a detection signal to be supplied to an U/D terminal of an up/down counter 28a. The up/down counter 28a is incremented in response to a clock when the detection signal is high in level, and decremented responsive to a clock when the detection signal is low in level. When the count value reaches "7", a carry signal is sent to a set terminal of an RS-FF circuit 28b. When the count value becomes "0", a borrow signal is given to a reset terminal of the same RS-FF circuit 28b. The RS-FF circuit 28b outputs a high level signal when given a pulse at the reset terminal, and decreases the output level from high to low when given a pulse at its reset terminal.

The RS-FF circuit 28b has a Q terminal serially connected to D-FF circuits 28c–28e. The D-FF circuits 28c–28f are given a clock every 3 $\mu$ seconds. As a result of this clock a D terminal input is latched. As a result, the D-FF circuits 28c–28e each outputs at a Q terminal a data row every 3 seconds. A 4-bit data row is obtained if including an output of the RS-FF circuit 28b.

The output of RS-FF circuit 28b is sent to an AND circuit 28n through an inverter 28h, to an AND circuit 28p through an inverter 28m, and directly to an OR circuit 28q. The output of D-FF circuit 28c is sent directly to an AND circuit 28n and OR circuit 28q, and to the AND circuit 28p to an inverter 28k. The output of the D-FF circuit 28d is sent directly to the AND circuit 28n and OR circuit 28q, and to the AND circuit 28p through an inverter 28j. The output of the D-FF circuit 28e is sent to the AND circuit 28n through an inverter 28f, to the AND circuit 28p through an inverter 28i, and directly to OR circuit 28q.

The AND circuits 28n and 28p each perform ANDing on their input data, while the OR circuit 28q ORing on its input data. Due to this, when the RS-FF circuit 28b and D-FF circuits 28c–28e have an output data row "0010", a pulse is outputted from the AND circuit 28n. Also, when the data row is "0000", a pulse is outputted from the AND circuit 28p. When the data row is "0001" or greater, i.e., when the numeral represented by a 4-bit data row is equal to or greater than "1", a pulse is outputted from the OR circuit 28q.

In this manner, when sequentially varying data row happens to represent "0001", it is considered that an ID signal time period has started, thus outputting a high level signal from the OR circuit 28q. Also, when the data row represents "0000", it is considered that the ID signal period has ended, thus outputting a high level signal from the AND circuit 28p. Furthermore, when the data row represents "0010", it is considered that particular information (identification code header for a monitor camera) has been obtained, thus outputting a high level signal from the AND circuit 28n. That is, the OR circuit 28q outputs an ID signal period start detection signal, the AND circuit 28p outputs an ID signal period end detection signal, and the AND circuit 28n outputs a particular information detection signal.

The downcounter 28r is loaded by a count value "6" when the output of the AND circuit becomes a high level. The downcounter 28s is loaded by a count value "4" when the output of the AND circuit 28p becomes a high level. The downcounter 28t is loaded by a count value "8" when the output of the OR circuit 28q becomes a high level. The downcounters 28r–28t each decrements the count value responsive to a horizontal sync signal, and outputs a borrow signal, i.e., a reset pulse P1, P3, P2 when the count value becomes "0".

As stated before, an ID signal is superimposed on lines 15 to 18 in an odd numbered field and on lines 277 to 280 in an even numbered field. On the other hand, a video component containing an effective period is started at line 23 in the odd numbered field and at line 285 in the even numbered field. That is, 8 lines exist between the ID signal start position and the effective line start position, while 4 lines exist between the ID signal AND position and the effective period start position. Also, particular information is added on line 17 in the odd numbered field and on line 279 in the even numbered field. As a result, there exist 6 lines between the particular information and the effective period start position. Due to this, by loading numerals "6", "4" and "8" into the downcounters 28r–28t and the count values are decremented responsive to a horizontal sync signal, whereby reset pulses P1, P3 and P2 are outputted at the start of an effective period.

Referring back to FIG. 2, the horizontal sync signal and vertical sync signal outputted from the synchronizing separator circuit 32 are also delivered to an H counter 36. The H counter 36 is reset in response to a vertical sync signal and decremented responsive to a horizontal sync signal. The H counter 30 has a count value to be delivered to a decoder 30b. The decoder 30b, when the count value becomes "23", outputs a reset pulse P4'. As understood from FIG. 6, when a pseudo vertical sync signal is accurately added, an effective period starts at 23th line from a start position of this signal. As a result of this, when the count value becomes "23", the decoder 30b outputs a reset pulse P4. In this manner, the created reset pulse P4 is also inputted to a priority processing circuit 30.

Figure 4:
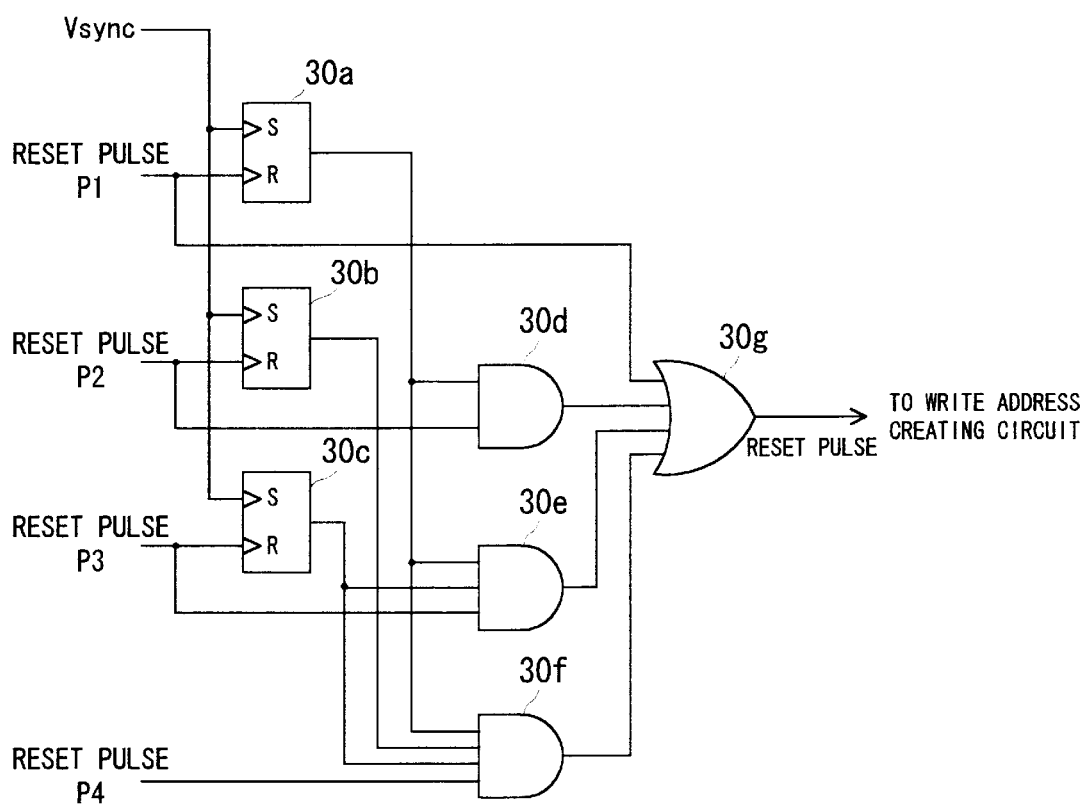
FIG. 4 is a block diagram showing a priority processing circuit.

Referring to FIG. 4, the reset pulses P1–P3 are respectively inputted to reset terminals of the RS-FF circuits 30a–30c, while the vertical sync signal is inputted to set terminals of the RS-FF circuits 30a–30c. Accordingly, the outputs of the RS-FF circuits 30a–30c rise responsive to the vertical sync signal and fall responsive to a corresponding reset pulse. An AND circuit 30d ANDes the output of RS-FF circuit 30a and the reset pulse P2. An AND circuit 30e performs ANDing on the outputs of the RS-FF circuits 30a, 30b and the reset pulse P3. An AND circuit 30f performs ANDing on the outputs of the RS-FF circuits 30a–30c and the reset pulse P4. Furthermore, an OR circuit 30d performs ORing on the reset pulse P1 and the outputs of the AND circuits 30d–30f, to output a logical sum signal to a write address creating circuit 40.

Where reset pulses P1–P4 are inputted at a timing, for example, as shown in FIG. 5(A)–(D), the reset pulses P3 and P4 are gated based on the reset pulse P2. On the other hand, the reset pulse P1 will not be gated by other reset pulses. From the OR circuit 30g, only the reset pulses P2 and P1 are outputted as shown in FIG. 5(E). That is, a reset pulse having a greater coefficient has a priority to a reset pulse having a smaller coefficient.

A write address creating circuit 40 has an address counter 40a so that a write address can be created based on a count value, as a reference, of the address counter 40a. That is, the video signals Va–Vd are written to the memory 18 as shown in FIG. 7. The video signal Va has a write start address (0, 0), whereas the video signals Vb–Vd have respective write start addresses (320,0), (0, 240) and (320,240). Accordingly, in each write address creating circuit 40, a write address is created based on a count value, as a reference, of an address counter 40a.

Figure 5:
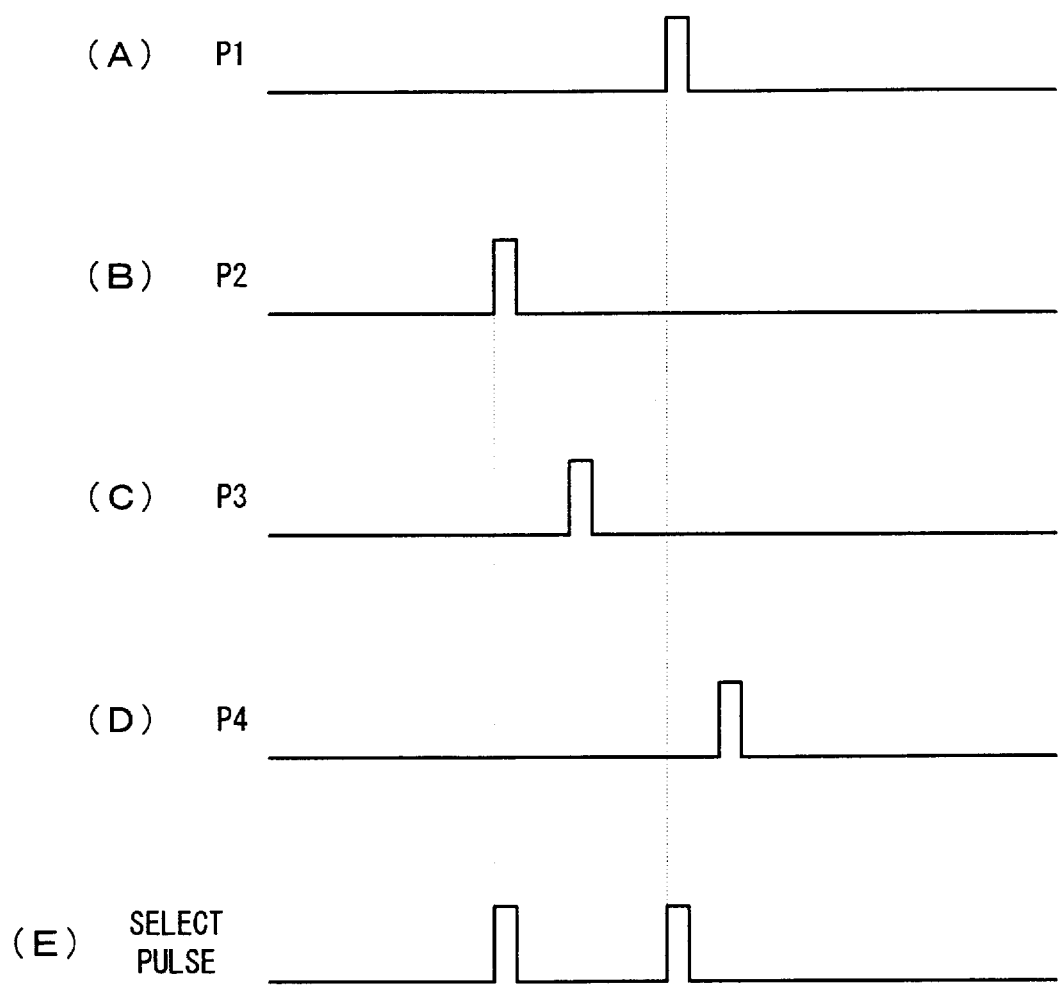
FIG. 5 is a timing chart showing part of operation of the priority processing circuit.

The count value of the address counter 40a as above is reset responsive to a reset pulse outputted from the priority processing circuit 30. In the example of FIG. 5 two reset pulses P1 and P2 are outputted so that the address counter 40a is reset by both the reset pulses. It should be noted that, because the last output is the reset pulse P1, a write address is determined based on the reset pulse P1. That is, a write address is determined based on the reset pulse P1 provided that all the reset pulses P1–P4 are outputted from the ID determining circuit 28 and decoder 38. When created by some of the reset pulses, the write address is reset by a reset pulse having a greatest coefficient.

The write address signals thus created are sent to the memory 18, and the video signals Va–Vd are written to desired addresses. Incidentally, the video signals Va–Vd are inputted differently in timing onto the terminals S1–S4 so that no interference occurs between write operations.

According to this embodiment, an effective period start position is specified based on an ID signal superimposed on a predetermined position of an video signal. Consequently, the video signal is written to the memory from its effective period start position without fail. Therefore, the video image on the monitor is free from vertical deflection. Meanwhile, because a plurality of reset pulses are processed in a predetermined priority order and a write address is determined based on any one of the reset pulses, deflection is positively prevented.

Incidentally, in this embodiment a high level signal was outputted from the AND circuit 28n when the 4-bit data row becomes "0010". This "0010" is particular information, i.e., a header to be added to a monitor camera identification code. Alternatively, an identification code of a corresponding monitor camera may be used, in place of a header, as particular information in order to output a high level signal from the AND circuit 28n responsive to a 4-bit data row representative of the particular information. In this case, there is a need, for each of the write controllers 16a–16d, to change the arrangement of inverters in a forward stage of the AND circuit 28n.

Figure 8:
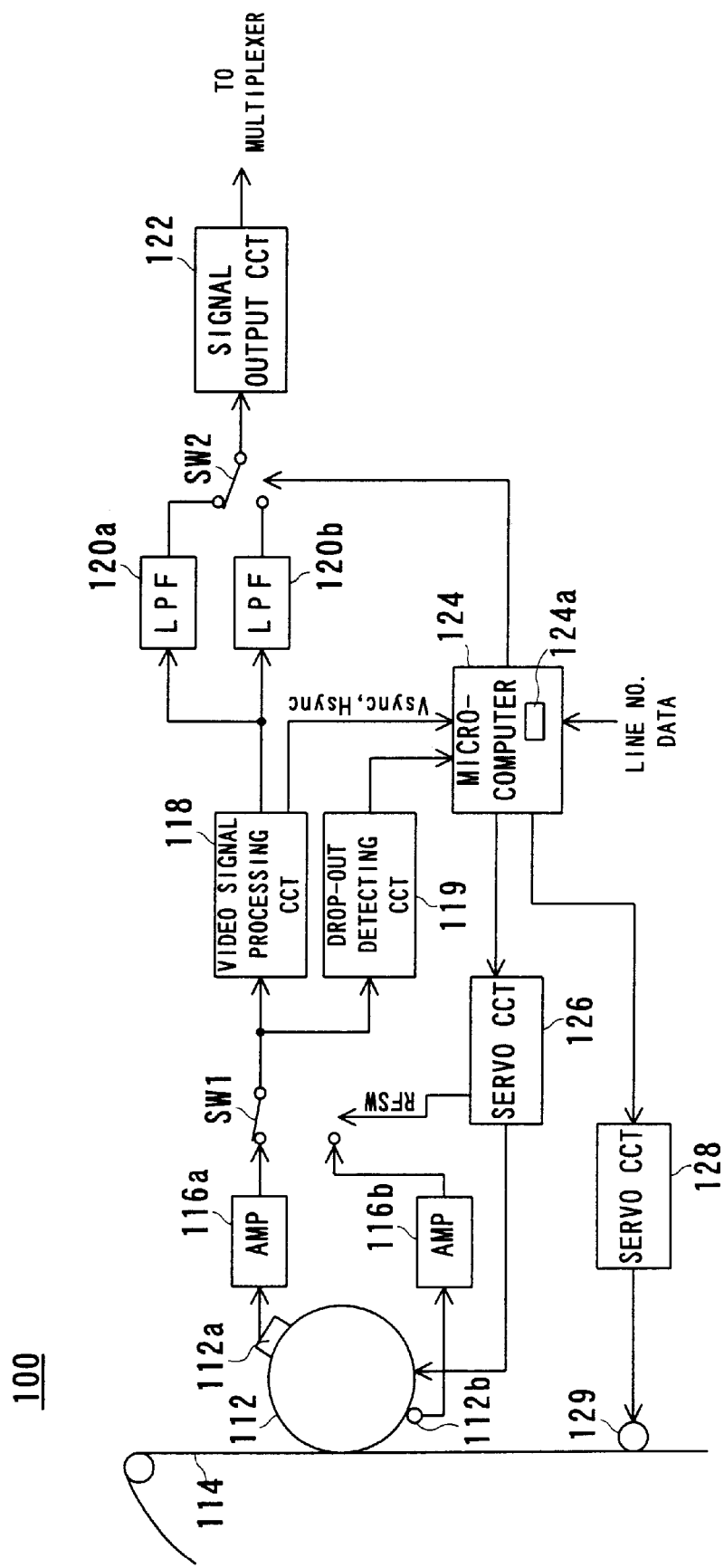
FIG. 8 is a block diagram showing another embodiment of the invention.

Referring to FIG. 8, a time lapse VCR 10 of this embodiment is applicable, in place of the time lapse VCR 2 shown in FIG. 16, to the monitor camera system of the same figure.

A video tape 114 is fed in a predetermined direction by a capstan motor 129. The composite video signals recorded on the video tape 114 are reproduced through heads 112a and 112b provided on a drum motor 112. The capstan motor 129 is controlled in rotational speed and direction by a servo circuit 128, while the dram motor 112 is controlled in rotational speed and direction by a servo circuit 126.

Figure 10:
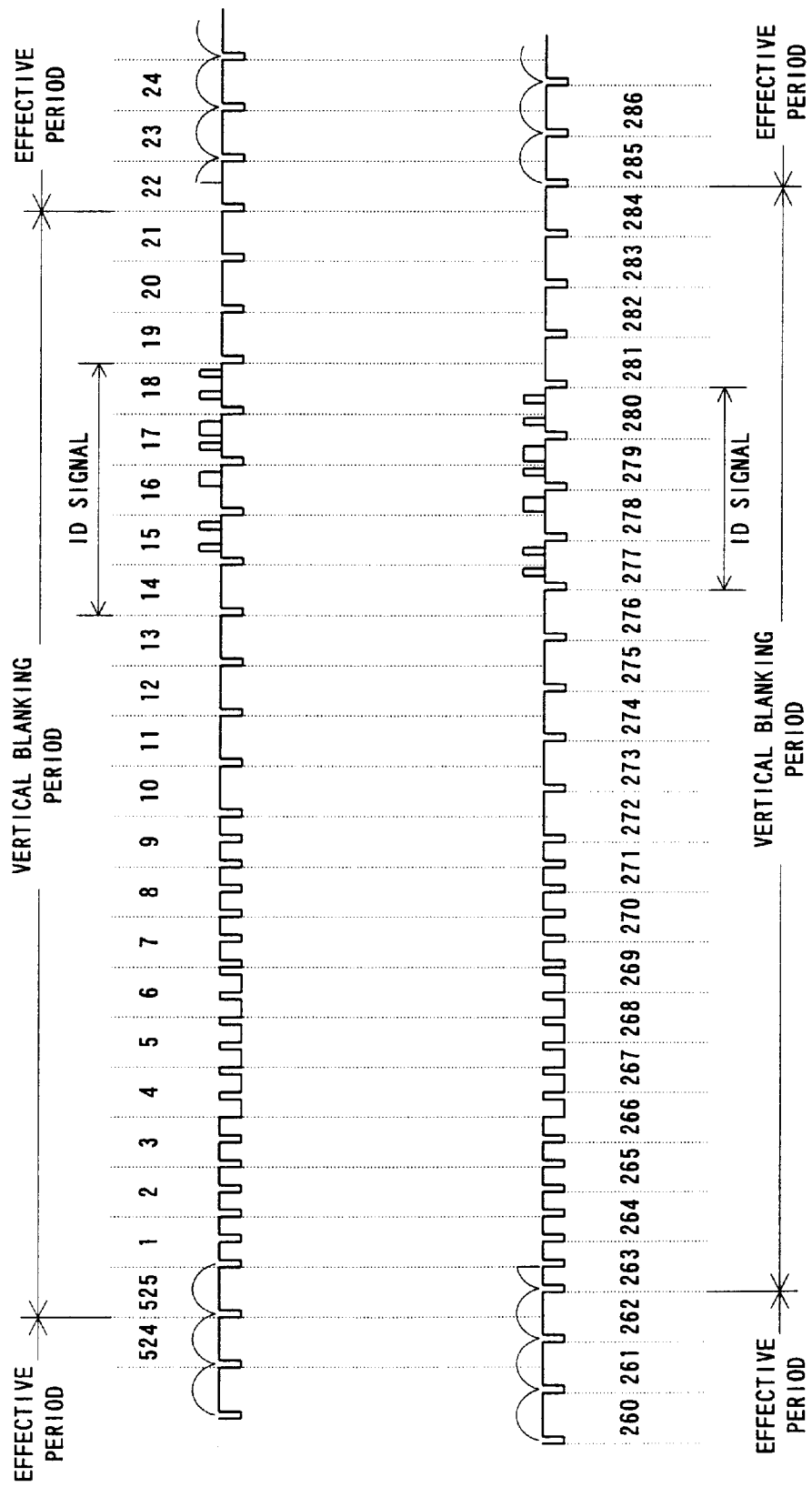
FIG. 10 is a waveform diagram showing one part of a composite video signal.

Referring to FIG. 9(A) and FIG. 9(B), on the video tape 114a plurality of video tracks are formed in a helical scan scheme. The respective video tracks are recorded with different kinds of composite video signals Va–Vd. The composite video signals cyclically change in the order of Va, Vb, Vc, Vd . . . on a track basis. Each composite video signal is superimposed with a predetermined ID signal. The ID signal is recorded on lines 15 to 18 in an odd numbered field and on lines 277 to 280 in an even numbered field. This ID signal is a signal to represent by which camera the corresponding composite video signal has been shot, specifically including an identification code such as camera number. It should be noted that FIG. 10 represents a composite signal according to the NTSC scheme. In the PAL scheme 1 frame comprises 625H and 1 field 312.5 H. Consequently, the ID signal is superimposed over lines 15–18 of an even numbered field and lines 327–330 of an odd numbered field.

The reproduced signal outputted through the heads 112a and 112b is delivered to a switch SW1 through amplifiers 116a and 116b. The switch SW1 is connected to an amplifier 116a side and amplifier 116b side depending upon a switching pulse (RFSW) outputted from a servo circuit 126. The reproduced signal outputted from the switch SW1 is an RF signal. Consequently, a video signal processing circuit 118 demodulates the RF signal into a base-band signal, and separates a vertical sync signal and horizontal sync signal from the demodulated base-band signal. The base-band composite video signal is outputted to LPFs 120a and 120b, while the vertical sync signal and horizontal sync signal are outputted to a microcomputer 124.

The microcomputer 124 recognizes what line a composite video signal is now being outputted from the video signal processing circuit 118, based on the input vertical sync and horizontal sync signals, and switches a switch SW2 in predetermined timing. Specifically, the switch SW2 is connected to an LPF 120b side during a 7-line period including lines 15 to 18 in an odd numbered field as well as a 7-lines period including lines 277 to 280 in an even numbered field (ID signal period). In periods other than this, the switch SW2 is connected to an LPF 120a side. The composite video signal selected by the switch SW2 is thereafter outputted to the multiplexer 4 through a predetermined process by a signal output circuit 122.

Figure 12:
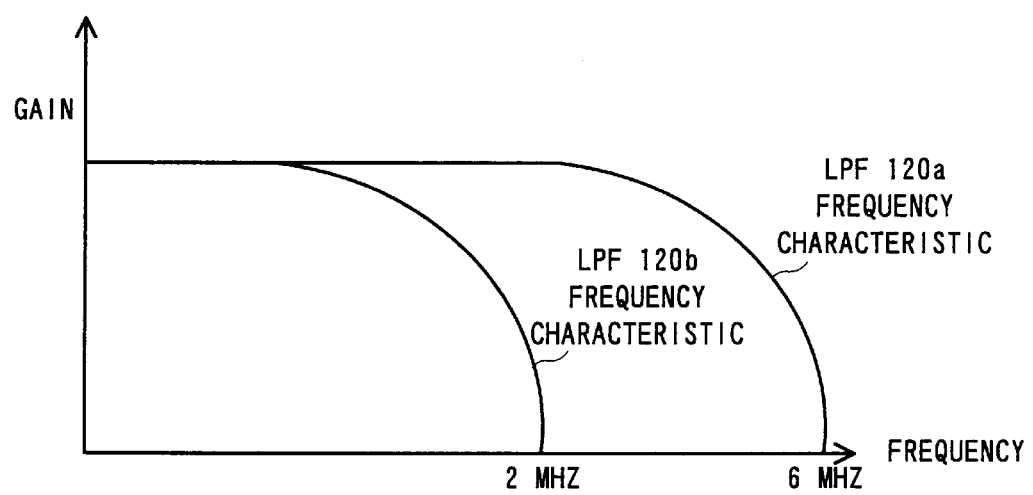
FIG. 12 is a graph showing a frequency characteristic of LPF in the FIG. 8 embodiment.

Referring to FIG. 12, the LPF 120 has a cut-off frequency of 6 MHz, while the LPF 120b has a cut-off frequency of 2 MHz. That is, the cut-off frequency of the LPF 120a is higher than a maximum value of a frequency possessed by a video component (color component), whereas the cut-off frequency of the LPF 120b is lower than a maximum value of a frequency possessed by the video component (color component). If the value of the ID signal is erroneously determined due to an effect of phase, a reproduced video cannot be displayed in a desired position. On the other hand, because the ID signal has only a high or low level, the ID signal if removed of a frequency component higher than about 2 MHz will have no effect on its value. On the other hand, because the video signal contains a color sub-carrier wave component of 4.58 MHz, a cut-off frequency of 2 MHz removes not only phase components but also video components.

Accordingly, in this embodiment an LPF to be enabled is switched depending upon a reproduced position. As a result, during the ID signal period a comparatively high frequency noise, such as white noise, is removed thereby improving the accuracy of ID signal determination. Meanwhile, during a period other than the ID signal period, the cutoff frequency is high and hence the visual video component will not be removed.

The reproduced signal (RF signal) outputted through the switch SW1 is also inputted to a drop-out detecting circuit 119. The reproduced signal has an envelope level depending on positions traced by the heads 112a and 112b. Where there is distortion in the video track as shown in FIG. 9(A) and FIG. 9(B), the trace positions by the heads 112a, 112b are deviated off from a desired video track. This results in unstable level in an reproduced envelope as shown in FIG. 11(C) or FIG. 11(E). Incidentally, FIG. 9(A) and FIG. 9(B) show a tracking state during still reproduction.

The drop-out detecting circuit 119 outputs a high level drop-out detection signal when the reproduced envelope level goes below a predetermined threshold. Consequently, when the envelope level varies as shown in FIG. 11(C), a drop-out detection signal as shown in FIG. 11(D) is outputted When the envelope level varies as shown in FIG. 11(E), a drop-out detection signal as shown in FIG. 11(F) is outputted.

The microcomputer 124 fetches a drop-out detection signal in the ID signal period. When the fetched drop-out detection signal is high in level, a tracking control signal is generated. The generated tracking control signal is supplied to the servo circuits 126 and 128. This changes the phases of the drum motor 112 and capstan motor 129.

Figure 11:
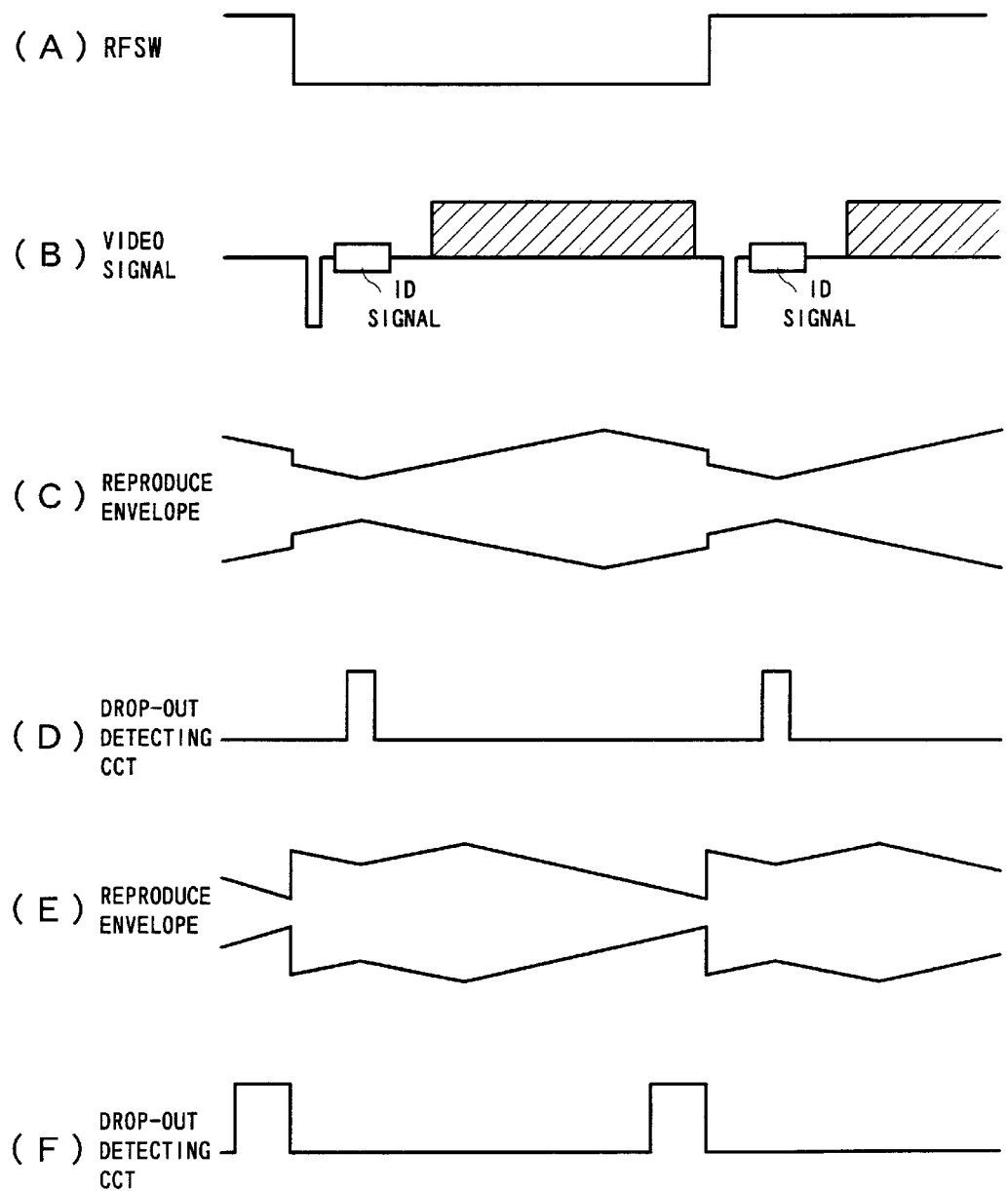
FIG. 11(A) is a waveform diagram showing RFSW.
FIG. 11(B) is a waveform diagram showing a composite video signal.
FIG. 11(C) is a waveform diagram showing one example of a reproduced envelope.
FIG. 11(D) is a waveform diagram showing one example of a drop-out detection signal.
FIG. 11(E) is a waveform diagram showing another example of a reproduced envelope.
FIG. 11(F) is a waveform diagram showing another example of a drop-out detection signal.

Referring to FIG. 11, where RFSW varies with a timing shown in FIG. 11(A), a composite video signal is produced with a timing as shown in FIG. 11(B). On the other hand, where the heads 112a and 112b have traced a position as shown in FIG. 9(A), a reproduced envelope varies as shown in FIG. 11(C) and accordingly the drop-out detection signal is outputted with a timing shown in FIG. 11(D). That is, the drop-out detection signal is in high level during the ID signal period. In such duration, a tracking control signal is outputted from the microcomputer 124.

Where the trace positions by the heads 112a, 112b are shifted from those in FIG. 9(A) to those in FIG. 9(B) as a result of tracking control, the reproduction envelope varies as shown in FIG. 11(E). Thus, a drop-out detection signal is outputted with a timing shown in FIG. 11(F). At this time, the drop-out detection signal is kept low in level during the ID signal period, and hence the tracking control signal is suspended from outputting.

By thus effecting tracking control, a sufficient envelope level is secured in portions including ID signals. It is therefore possible to accurately determine a content of an ID signal.

Figure 13:
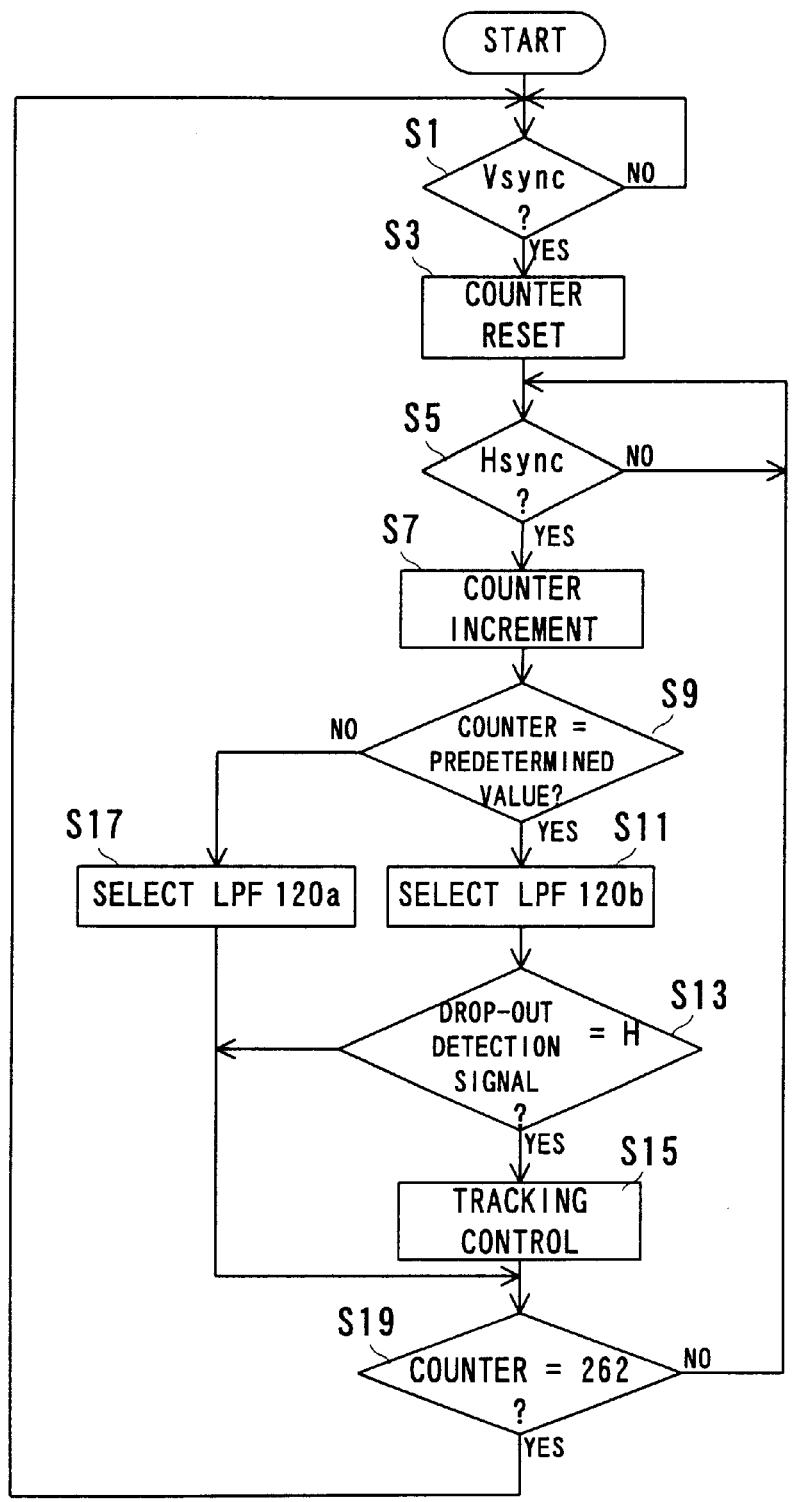
FIG. 13 is a flowchart showing one part of operation in the FIG. 8 embodiment.

The microcomputer 124 performs processing according to the flowchart shown in FIG. 13. First, in step S1 it is determined whether or not a vertical sync signal has been inputted. If "YES", in step S3 the counter 124 is reset. Subsequently, it is determined in step S5 whether or not a horizontal sync signal has been inputted. If "YES", the counter 124a is incremented. As a result, the count value indicates current line no. of a composite video signal. In step S9 the count value of the counter 124a is compared with line no. data of "14" to "19". The line no. data as this is set in the microcomputer 124, according to a control signal from the multiplexer 4 or an operator's instruction.

If the count value does not agree with any of the line nos. "14" to "19", the microcomputer 124 in step S9 determines "NO" and in step S17 connects the switch SW2 to the LPF 120a side, the process advancing to step S19. On the other hand, if the count value agrees with any of "14" to "19" the microcomputer in step S9 determines "YES" and in step S11 connects switch SW2 to the LPF 120b side, followed by determining a level of a drop-out detection signal in step S13. Here, if the drop-out detection signal is in low level, the process advances as it is to the step S19. However, if the drop-out detection signal is in high level, in step S15 a tracking control signal is outputted and the process advances to the step S19.

In step S19, it is determined whether or not the count value becomes "262". If "NO", the process returns to the step S5 while if "YES" the step returns to the step S1. Accordingly, before the count value has reached "262", the counter 124a is incremented in response to a horizontal sync signal. If the count value has become "262", the counter 124 is reset in response to a vertical sync signal. Here, "262" is a last line no. of an even field. The counter 124a counts by the number of lines of one field. Accordingly, when reproduced are signals in lines 14 to 19 and lines 276 to 281 shown in FIG. 10, "YES" is determined in the step S9.

As a result of performing the above processes, the switch SW2 is connected to the LPF 120 when the counter 124a exhibits any of count values "14"–"19" and "276"–"281", and to the LPF 120a when exhibiting other count values than those. On the other hand, tracking control is effected when the counter 124a exhibits any of the count values "14"–"19" and "276"–"281" and further the drop-out detection signal is at a high level. No tracking control is effected unless the count value is at any of the above values even if the drop-out detection signal is at a high level, besides where the drop-out detection signal is at a low level.

Figure 14:
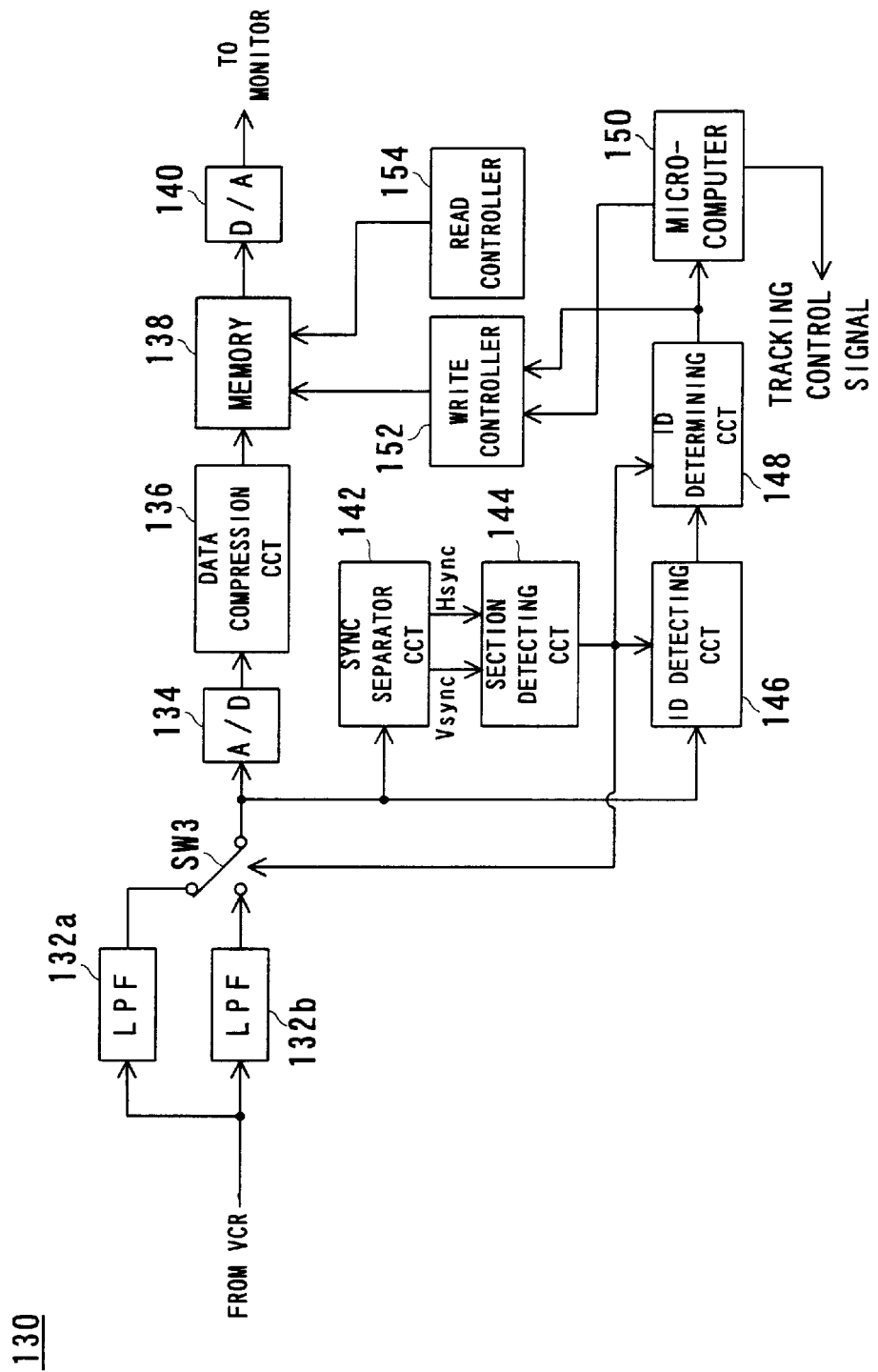
FIG. 14 is a block diagram showing another embodiment of the invention.

Referring to FIG. 14, a multiplexer 130 of another embodiment is applicable, in place of the multiplexer 4 of FIG. 16, to the monitor camera system of the same figure.

A composite video signal outputted from the time lapse VCR 2 is inputted to LPFs 132a and 132b. The LPFs 132a and 132b respectively have the same frequency characteristics as those of the aforementioned LPFs 112a and 112b. Consequently, the LPF 132a outputs a composite video signal having a frequency component higher than 6 MHz removed, while the LPF 132b a composite video signal a frequency component higher than 2 MHz removed. The switch SW3 is connected to the LPF 132b during the ID signal period (6-lines period of from line 14 to line 19 and 6-lines period of from line 276 to line 281), and to the LPF 132a during a period other than the ID signal period. As a result, ID signal determination accuracy can be improved and further the visual video component can be prevented from being removed, similarly to the FIG. 8 embodiment.

The composite video signal outputted through the switch SW3 is converted into a digital signal (video data) by an A/D converter 134. The converted video data is then compressed to ¼ by a data compression circuit 136. That is, the data is compressed ½ in size in both vertical and horizontal directions. The compressed video data is subsequently delivered to a memory 138 where it is written to a predetermined address by a write controller 152. The video signals are inputted in the order of Va, Vb, Vc, Vd from the time lapse VCR 2 so that the compressed video data is written to a predetermined area depending upon its kind. That is, the memory area is 4-divided in order to store a same kind of compression video data into a same divisional area.

The video data thus stored within the memory 138 is thereafter read out by the read controller 154 and then outputted onto the monitor 5. As a result, 4 kinds of reproduced videos are multi-displayed on the monitor 5 screen.

The composite video signal outputted through the switch SW3 is also inputted to an ID detection circuit 146. The ID detection circuit 146 monitors an input signal level during the ID signal period, and outputs a high level signal when a high level period exceeds 3, seconds. As a result of this, an ID signal is detected that has been superimposed on the composite video signal. The ID determination circuit 148 fetches an output signal of the ID detection circuit 146 during the ID signal period, to determine a value possessed by the fetched signal. At this time, if the ID signal value can be successfully determined, the ID determination circuit 148 outputs a determination signal having a determination value (camera number) and "OK". In contrast to this, if the ID signal value cannot be determined due to an effect of noise, the ID determination circuit 148 outputs a determination signal having "NG".

The determination signal is supplied to the write controller 152 and microcomputer 150. When the determination signal represents "OK", the microcomputer 150 enables the write controller 152. The write controller 152 writes the compressed video data to a predetermined visual area based on the ID signal value contained in the determination signal.

In contrast, the determination signal represents "NG", the microcomputer 150 disables the write controller 152 and outputs a tracking control signal to the time lapse VCR 2 through a serial cable (not shown) such as RS-485. As a result of the disabled write controller 152, the data writing to the memory 138 is suspended and the compressed video data now stored within the memory 138 is read out by controller 154. Also, as a result of outputting the tracking control signal, tracking is controlled in the time lapse VCR 2. As a result of this, a sufficient envelope level is secured in portions containing ID signals. Consequently, the ID determination circuit 148 can accurately determine a content of an ID signal.

The ID signal period is detected as follows. First, the synchronizing separator circuit 142 separates a vertical sync signal and horizontal sync signal from the composite video signal outputted through the switch SW3. Next, the section detection circuit 144 counts the number of lines based on these sync signals to detect an ID signal period. Detecting an ID signal period, the section detection circuit 144 outputs a high level detection signal. The switch SW3 is connected to the LPF 120a side when this detection signal is low in level, and to the LPF 120b side when high in level. On the other hand, the ID detection circuit 146 and the ID determination circuit 148 are enabled only in duration that the detection signal is at a high level.

Figure 15:
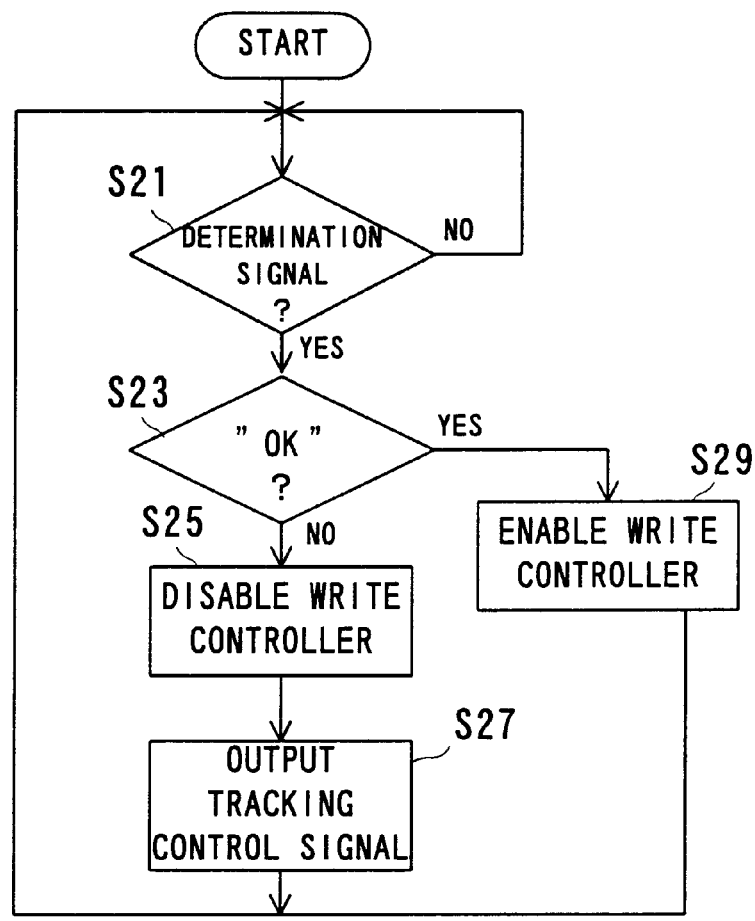
FIG. 15 is a flowchart showing one part of operation in the FIG. 14 embodiment.

The microcomputer 150 performs processing according to the flowchart shown in FIG. 15. First, in step S21 it is determined whether a determination signal has been inputted from the ID determination circuit 148. If "YES" here, the process advances to step S23 to determine whether the determination signal represents "OK" or "NG". If representing "OK", the microcomputer 50 in step S29 enables the write controller 152, and the process returns to the step S21. On the other hand, if the determination signal represents "NG", the microcomputer 150 in step S25 disables the write controller 52 and, in step S27, outputs a tracking control signal to the time lapse VCR 2. Then, the process returns to the step S21.

According to FIG. 8 and FIG. 14 embodiments, detected is a reproduction characteristic of a portion containing an ID signal by the drop-out detection circuit or ID determination circuit. If there is deterioration in the reproduction characteristic, tracking control is effected by the microcomputer. Also, two LPFs are provided in order to remove a reproduced composite video signal having a predetermined frequency component. Either one of the LPFs are enabled depending upon a reproduction position. That is, the frequency characteristic is switched depending on a reproduction position. In particular, the ID signal containing portion is lowered in cut-off frequency as compared to other portions. The cut-off frequency therefor is set within a video component frequency band. Such two of processing improve the accuracy of determining an ID signal content. Incidentally, although explanations were on still picture reproduction in the FIG. 8 and FIG. 14 embodiments, this invention is also applicable to particular types of reproduction, such as high-speed reproduction, other than still reproduction and further to normal reproduction. Also, there is no need to record a plurality of kinds of video signals provided that each track is recorded with an ID signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A signal processing apparatus for processing a video signal having predetermined information component provided in a first predetermined position in each field, comprising:

a component detector for detecting the predetermined information component;

a specifier for specifying a second predetermined position of the video signal by counting the number of lines of the video signal based on a detection timing by said component detector;

a memory;

a writer for writing the video signal from the second predetermined position to said memory; and a reader for reading out the video signal written in said memory.

2. A signal processing apparatus for processing a video signal having a predetermined information component provided in a first predetermined position of each field, comprising:

a detector for detecting said predetermined information component;

a processor for specifying a second predetermined position of said video signal based on said predetermined information component detected;

a memory;

a write controller for writing said video signal from said second predetermined position to said memory; and a read controller for reading out said video signal written in said memory, wherein said processor includes a particular information detecting circuit to detect particular information from said predetermined information component and a first counter to count the number of lines based on a detection time point, as a reference, of said particular information and output second predetermined position information.

3. A signal processing apparatus according to claim 2, wherein said predetermined information component lies over a plurality of lines, and said processor further includes a start position detecting circuit to detect a start position of said predetermined information component and a second counter to count said number of lines based on a detection time point, as a reference, of said start position and output said second predetermined position information.

4. A signal processing apparatus according to claim 3, wherein said processor further includes an end position detecting circuit to detect an end position of said predetermined information component and a third counter to count said number of lines based on a detection time point, as a reference, of said end position and output said second predetermined position information.

5. A signal processing apparatus according to claim 4, further comprising a selector to select respective ones of said second predetermined position information in a predetermined order.

6. A signal processing apparatus according to claim 5, wherein said write controller includes an address counter to reset a write address in response to said second predetermined information outputted from said selector.

7. A signal processing apparatus according to claim 2, wherein said second predetermined position is a start position of an effective component of said video signal.

8. A signal processing apparatus for processing a reproduced signal, which contains a video component and an ID information component, reproduced by a rotating head from a helical track formed on a magnetic tape, comprising:
   a detector for detecting the ID information component from the reproduced signal;
   a determiner for determining an ID number indicated by the ID information component detected by said detector; and
   a tracking controller for outputting a tracking control signal for controlling a tracking operation of said rotating head when the ID number is not correctly determined by said determiner and suspending outputting of the tracking control signal when the ID number is correctly determined by said determiner.

9. A signal processing apparatus according to claim 8, further comprising:
   a remover to remove a predetermined frequency component from the reproduced signal; and
   a characteristic controller to change a frequency characteristic of said remover depending upon a reproduction position.

10. A signal processing apparatus according to claim 9, wherein said remover includes a plurality of filters different in cut-off frequency, and said characteristic controller includes a selector to select any one of said plurality of filters.

11. A signal processing apparatus according to claim 9, wherein said characteristic controller lowers a cut-off frequency at a time of reproducing the ID information component.

12. A signal processing apparatus according to claim 1, wherein said predetermined information component includes particular information, and said specifier includes a particular information detector to detect the particular information from the predetermined information component, and a first counter to count the number of liens of the video signal in reference to a detection timing of the particular information and output second predetermined position information.

* * * * *